UNITED STATES PATENT OFFICE.

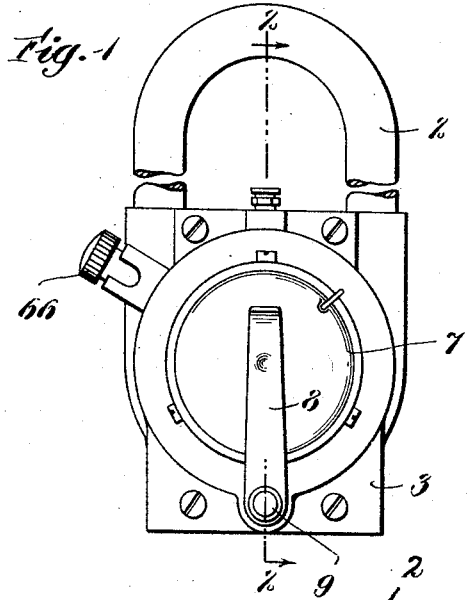

BUTLER AMES, OF LOWELL, MASSACHUSETTS.

STATOR FOR ELECTRICAL MACHINES.

1,415,762. Specification of Letters Patent. Patented May 9, 1922.

Original application filed February 16, 1918, Serial No. 217,468. Divided and this application filed April 29, 1921. Serial No. 465,414.

*To all whom it may concern:*

Be it known that I, BUTLER AMES, a citizen of the United States of America, and resident of Lowell, in the county of Middlesex and State of Massachusetts, have invented new and useful Improvements in Stators for Electrical Machines, of which the following is a specification.

This invention relates to electrical machines and more particularly to generators of the magneto type, this application being a division of my prior application Ser. No. 217,468, filed February 16, 1918.

The principal objects of the invention are to provide a magneto generator which is light and compact in construction, which produces a relatively large number of impulses of current per pole, which will supply ignition impulses to either two or four cycle engines having any number of cylinders, whose magnetic circuit has low reluctance, whose windings encircle the axis of the rotor, which maintains high efficiency throughout a wide range of velocities and at relatively high velocities, in which the laminated portion of the magnetic circuit is rigidly and compactly incorporated with the other portions of the machine, and generally to improve and perfect apparatus of the character referred to. By utilizing the present invention only in certain of its aspects certain of the aforesaid objects may be attained independently of other of the objects but in its preferred form the invention permits the attainment of all of the aforesaid objects concomitantly.

The invention comprises improvements in both the rotor and stator of a generator and also in the association of these two parts together. The rotor is provided with an axial core and around this core is provided the windings, a single set in the case of an ordinary generator but preferably a plurality of sets in the case of a magneto generator. These windings are preferably mounted on the rotor for the sake of compactness and efficiency but, in so far as certain aspects of the invention are concerned, the windings may be non-rotatably mounted closely to surround the core inasmuch as the current is generated by varying the magnetic flux and not by moving conductors transversely through a constant magnetic field. On opposite sides of the windings magnetic pole pieces extend radially from the axial core, that is, away from the axis of the core although not necessarily perpendicularly to the axis of the core, a distance sufficient to bring them into proximity to the stator poles when the two sets of poles are rotated relatively to each other. While either or both sets of poles may be rotated, I preferably rotate the inner set and therefore designate the inner and outer sets as rotor and stator poles respectively. Moreover, this relative motion between the pole pieces is the only motion essential to the present invention in its broader aspect, it being possible to maintain both the windings and axial core stationary inasmuch as the relative motion between the pole pieces of the rotor and stator produces a varying magnetic field about the windings which generates the current. The outer ends of the radial portions of the rotor core which rotate along the faces of the stator core have a relatively large area so as to reduce the reluctance of the air-gap between the rotor and stator and this is preferably accomplished, when the radial portions extend beyond the periphery of the windings, by extending the outer ends of the radial portions axially over the windings. The radial portions of the rotor core at one end of the rotor are staggered with relation to the radial portions at the other end of the core, thereby affording certain unique advantages as will hereinafter appear.

My improved stator comprises a plurality of poles of opposite polarity spaced about the periphery of the core so as to cooperate with the rotor in producing a variable magnectic field about the windings of the machine as the rotor rotates. These poles are spaced apart an angular distance approximately equal to the angular distance between certain pairs of rotor poles, which pairs comprise one pole at each end of the rotor, and for most purposes I deem it preferable to make this distance approximately equal to the angular distance between adjacent rotor poles. Thus, when employing two stator poles and four rotor poles (two at each end) the stator poles are spaced apart a distance of approximately 90°. However, when the angular distance between adjacent rotor poles is small, as for example when employing a large number of rotor poles, the stator poles may be spaced further apart. For example, when employing two stator poles and eight rotor poles (four at each end) the stator poles may be spaced apart three rotor pole spaces instead of a single space, that is, 135° instead of 45°. When employing only a single pair of stator poles cooperating with adjacent rotor poles the stator poles may be disposed on one side of the rotor so that the entire width of the device need be only slightly greater than the diameter of the rotor.

In the accompanying drawings,—

Figure 1 is an end elevation of one embodiment of my improved device;

Figure 2 is a vertical longitudinal central section of the device, parts being shown in elevation;

Figure 3 is a vertical transverse section on line 3—3 of Fig. 2.

The stator of my improved generator resembles the ordinary construction in that it comprises a casing 1 surrounding the rotor, and in that permanent U-magnets are employed to produce the magnetic field, four such magnets being shown in Figs. 1, 2 and 3. The casing 1 is substantially cylindrical in contour, although in external appearance it appears rectangular inasmuch as it is provided with a base 3 and inasmuch as its sides are carried upwardly to enclose the pole pieces 4 which preferably extend the full length of the rotor core. The pole pieces 4 are preferably formed of laminations disposed in horizontal longitudinal planes and these laminations are preferably cast into the frame 1. The surfaces 5 and 6 of the pole pieces are preferably tapered so that the laminations are rigidly held in the frame. The U-magnets 2 pass through openings in the top of the casing 1 and project into the poles 4 a short distance. The recesses in the poles 4 for the U-magnets are formed by stamping circular openings in the upper laminations before building them into pole pieces so that the magnets fit squarely against both the bottoms and sides of the recesses. Within the casing 7 at the right-hand (Fig. 2) end of the frame 1 is provided switch mechanism of the usual type to make and break the armature circuit at suitable intervals, the casing 7 being held in position over the switch mechanism by means of a spring 8 pivotally mounted on the end of a stud 9 projecting from the left end of the frame 1.

By making the field magnets circular in cross-section a marked increase in efficiency is attained. Moreover, circular magnets may be hardened more easily and uniformly inasmuch as, unlike rectangular magnets, they present no corners to become unduly hard during the tempering process. I have also found that the efficiency and life of the magnets is greatly increased by spacing them apart so that they do not contact with each other.

My improved rotor 13, completely disclosed in my copending application Serial No. 217,468, previously mentioned, is provided with transverse pole pieces 20, 21, 22, and 23 arranged in staggered relation and electrically connected to the core of the rotor.

Projecting outwardly from the left (Fig. 2) end of the rotor is an axial shaft 26 by means of which the rotor is supported at the ends through the medium of ball bearings 27 and 45 and by which the rotor may be driven. Fast on the shaft 26 between the end of the rotor and the bearing 27 is a slip ring or collector ring comprising a pulley-shaped member 28 and a conducting ring 29. In cooperative relationship with the slip ring 29 is mounted a collector brush 30 by means of a tube 31 of insulating material mounted in a knurled nut 32 threaded into an opening in the top of the frame 1.

A make-and-break switch (not shown) is contained within housing 7 at the opposite end of the generator, binding post 66 projecting therefrom serving as the connection for the external circuit.

The operation of the device is as follows: When the rotor is rotated the poles 20 to 23 of the rotor alternately pass the poles 4 of the stator. Assuming that the left stator pole is the north pole and the right stator pole is the south pole, as indicated in Fig. 3, the action of the magnetic field may be explained as follows: When the rotor pole 20 is in opposition to the north pole N of the stator the rotor pole 23 will be in opposition to the south pole S and magnetic flux may be assumed to flow from the north stator pole N through rotor pole 20 to the axis of the rotor, thence through the axial core to the opposite end of the rotor, and thence through rotor pole 23 to the south pole S of the stator. When the rotor has rotated through 90°, for example in a clockwise direction as indicated by the arrow in Fig. 3, the rotor pole 20, which was formerly in opposition to the north pole of the stator, will have moved into a position opposite to the south stator pole S, and the rotor pole 22 (opposite to rotor pole 23) will have moved into a position opposite to the north stator pole N. The flux through the rotor will then be reversed, the flux entering from the north stator pole N through the rotor pole 22, passing through the core, and thence passing through the rotor pole 20 to the south stator pole S. When the rotor has rotated through another 90° the rotor pole 22 will be opposed to the stator pole S and the rotor pole 21 will have moved into opposition to the stator pole N, in which position the flux through the rotor will again be reversed. Thus the flux through the rotor will be reversed four times per revolution of the rotor, and the apparatus will therefore produce four impulses of current per revolution. The device is therefore particularly adapted to use with eight-cylinder engines inasmuch as it can be driven at the same velocity as the engine and at the same time produce four sparks per revolution as required by an ordinary eight-cylinder engine.

When employing four rotor poles 20, 21, 22 and 23, arranged in staggered relationship as shown, and when using two stator poles spaced apart an angular distance of 90° it will be observed that each of the rotor poles are active throughout 90° of each rotation, namely, while passing the stator poles, and that each rotor pole is then inactive throughout substantially 270°. Owing to this long inactive period the residual magnetism in the rotor poles is permitted to die out and become neutralized before the pole again comes into operative relationship with the stator poles. By staggering the poles of the rotor and arranging the stator poles an angular distance apart approximately equal to the angular distance between a rotor pole at one end of the rotor and a rotor pole at the other end of the rotor a greater number of impulses of current are obtained than where the rotor poles are not staggered and where the stator poles are spaced 180° apart. Thus when employing four rotor poles and two stator poles as illustrated, four impulses of current per revolution are obtained instead of two. Obviously by increasing the number of rotor poles and at the same time arranging them in staggered relationship any desired number of impulses per revolution could be obtained. Moreover, instead of using only a single pair of stator poles a plurality of pairs may be employed. The extensions on the ends of the rotor poles provide an increased pole area opposing the stator poles whereby the reluctance of the air-gaps is materially decreased. Moreover, these extensions, when arranged to project over the armature windings as illustrated, serve in conjunction with the cylinder of insulation in which the pole pieces are embedded to counteract the centrifugal force applied to the rotor windings and the device can therefore be safely operated at unusually high velocities.

I claim:

1. In an electrical machine, a stator comprising a laminated pole piece, the laminations on one side of said pole piece having alined openings therein and the succeeding laminations being continuous so as to form a recess with a flat bottom, and a magnet fitting into said recess, said magnet having a flat end seating against said flat bottom.

2. In an electrical machine of the type having a stator and a rotor, a stator comprising a frame at least partially surrounding the rotor, field magnets and laminated pole pieces mounted in said frame to present the edges of their laminations to the rotor, said laminations being disposed in planes perpendicular to the axes of the field magnets, and alined openings in said pole pieces receiving the free ends of the field magnets.

3. In an electrical machine of the type having a stator and a rotor, a stator comprising a frame at least partially enclosing the rotor, the width of said frame being only slightly greater than the diameter of the rotor, pole pieces mounted in one side of said frame in spaced relationship, parallel openings in said pole pieces, and a U-shaped magnet having its free ends received in said openings, whereby the width of said frame is not increased by said pole pieces and said magnet.

4. In an electrical machine of the type having a stator and a rotor, a stator comprising two laminated pole pieces mounted in spaced relationship around the rotor with their laminations parallel with each other, said pole pieces having openings therein perpendicular to the laminations, and a U-magnet having its free ends extending into said openings in said pole pieces respectively.

Signed by me at Lowell, Massachusetts, this 14th day of April, 1921.

BUTLER AMES.